United States Patent [19]

Siewert et al.

[11] Patent Number: 5,514,851
[45] Date of Patent: May 7, 1996

[54] PREVENTION OF CONTACT TUBE MELTING IN ARC WELDING

[75] Inventors: Thomas A. Siewert, Boulder; R. Bruce Madigan, Longmont; Timothy P. Quinn, Boulder, all of Colo.

[73] Assignee: The United States of America as represented by the Secretary of Commerce, Washington, D.C.

[21] Appl. No.: 226,040

[22] Filed: Apr. 11, 1994

[51] Int. Cl.[6] ....................................... B23K 9/10
[52] U.S. Cl. ............................ 219/130.21; 219/137 PS
[58] Field of Search ................ 219/137.71, 130.01, 219/130.21, 130.31, 137.7, 137 PS

[56] References Cited

U.S. PATENT DOCUMENTS

| | | |
|---|---|---|
| 3,370,151 | 2/1968 | Normando . |
| 3,501,614 | 3/1970 | Allen .................................. 219/137.71 |
| 3,526,748 | 9/1970 | Rienks . |
| 3,567,901 | 3/1971 | Deininger et al. . |
| 3,602,687 | 8/1971 | Pollock . |
| 3,906,184 | 9/1975 | Gibbs et al. ...................... 219/130.21 |
| 4,093,844 | 6/1978 | Fellure et al. . |
| 4,247,751 | 1/1981 | Ashton et al. .................... 219/137.71 |
| 4,280,137 | 7/1981 | Ashida et al. . |
| 4,300,036 | 11/1981 | Johansson . |
| 4,301,355 | 11/1981 | Kimbrough et al. . |
| 4,348,578 | 9/1982 | Masaki . |
| 4,443,687 | 4/1984 | Toth ................................... 219/130.31 |
| 4,733,051 | 3/1988 | Nadeau et al. . |
| 4,816,639 | 3/1989 | Sugitani et al. . |
| 4,831,233 | 5/1989 | Gordon . |
| 5,075,534 | 12/1991 | Torii et al. . |
| 5,157,236 | 10/1992 | Batzler et al. . |

*Primary Examiner*—Clifford C. Shaw
*Attorney, Agent, or Firm*—Evenson, McKeown, Edwards & Lenahan

[57] ABSTRACT

A method and apparatus for preventing catastrophic melting of the contact tube in continuously-fed consumable electrode arc welding due to wire feed interruptions by monitoring the movement of the wire electrode with a high frequency sensor such as an optical encoder having a resolution on the order of <0.1 second and switching off the power to the welding apparatus if the wire electrode speed falls below a predetermined threshold.

11 Claims, 2 Drawing Sheets

PREVENTION OF CONTACT TUBE MELTING IN ARC WELDING

BACKGROUND OF THE INVENTION

Welding processes that use a continuously-fed consumable electrode tend to have simple, open-loop control systems. When ready to weld, the operator depresses a trigger on the welding gun which both energizes the wire feed motor and applies welding voltage to the electrode. When the weld is completed, the operator releases the trigger, stopping the wire feed motor and opening the welding power circuit. The two subsystems, wire feed and lo welding power, are traditionally activated and deactivated at the same time.

The wire feed may be unintentionally interrupted during consumable-wire-fed arc welding due to arcing between the tube and electrode, a clogged liner, or reaching the end of the electrode. In these cases, the wire feed stalls while the welding current continues to melt the electrode. This upsets the steady-state equilibrium between the electrode melting rate and the feeding rate, and the arc length begins to increase. The arc grows until it reaches the contact tube, where it melts the tube and contaminates the weld with molten contact tube alloy, e.g. copper alloy. In the past, recovery from this event has required the replacement of the tube and time-consuming hand grinding to remove the contaminated region from the weld.

users of continuously-fed wire electrode welding devices have attempted to avoid this melting of the contact tube by simply changing their tubes often, with time intervals sufficiently short that the tube life is never exceeded, and replenishing the supply of electrode. However, premature replacement of the tubes increases costs and reduces welding productivity. Moreover, it is not always possible to know in advance when to change the tube and the electrode supply, so melting of the tip is still a common occurrence.

Commercial feed rate transducers are designed primarily for checking the average feed rates for conformance to welding procedure requirements. The transducers include averaging circuits and filters to eliminate any short-term variations in the electrical signals. These sensor systems typically have response times on the order of approximately 0.5 to 1 second. Such systems are of no value in preventing contact tube melting because the time interval between interruption of the wire feed and the onset of contact tube melting is much shorter than the response time of the sensor.

There has remained a need in the art for a way to prevent melting of contact tubes if the wire electrode feed is interrupted.

SUMMARY OF THE INVENTION

It is the object of the invention to provide a method for preventing melting of the contact tube in a continuously fed consumable electrode welding apparatus if the feed of wire electrode is interrupted.

Another object of the invention is to provide an apparatus for preventing melting of the contact tube in a continuously fed consumable electrode welding apparatus if the feed of wire electrode is interrupted.

These and other objects of the invention art achieved by providing a method of preventing contact tube melting in arc welding using an advancing consumable electrode comprising the steps of:

advancing a consumable welding electrode at a desired rate through a contact tube toward a workpiece to be welded;

applying a welding voltage between the contact tube and the workpiece and generating a welding arc between the advancing consumable electrode and the workpiece;

monitoring the consumable electrode advance rate with a sensor having a response time of less than about 0.1 second;

comparing the monitored electrode advance rate to a threshold valve indicative of an interruption in the electrode advance, and if the monitored electrode advance rate falls below the threshold value, interrupting the application of the welding voltage before continued consumption of the electrode brings the welding arc into contact with the contact tube.

In accordance with a further aspect of the invention, the objects are also achieved by providing an apparatus for preventing contact tube melting in arc welding comprising:

a source of consumable welding electrode;

a drive unit for advancing the consumable electrode at a desired rate toward a workpiece to be welded;

a contact tube through which the consumable electrode is advanced;

an electrical power supply electrically connected to apply a welding voltage between the contact tube and the workpiece and generate a welding arc between the consumable electrode and the workpiece;

an electrode advance rate sensor having a response time of less than about 0.1 second;

a control unit connected to said electrode advance rate sensor for comparing the sensed advance rate with a threshold value indicative of an interruption in the electrode advance, said control unit terminating the application of the welding voltage between the contact tube and the workpiece if the sensed advance rate falls below the threshold value.

In contrast to a contact tube wear sensor, which only indicates when the wear or other reason for wire electrode blockage is beginning to cause instability of the arc and has reached a degree where blockage might occur, but does not detect actual blockage, the method and apparatus of the present invention provide a way to reliably sense conditions which lead to melting of the contact tube and to shut off the welding apparatus before damage to the tube occurs.

BRIEF DESCRIPTION OF THE DRAWINGS

The invention will be described in further detail hereinafter with reference to the accompanying drawings in which.

DETAILED DESCRIPTION OF PREFERRED EMBODIMENTS

In accordance with the present invention, a control strategy is implemented which involves detecting blockage of the electrode wire feed and stopping the welding current before the contact tube can melt.

Figure 1:
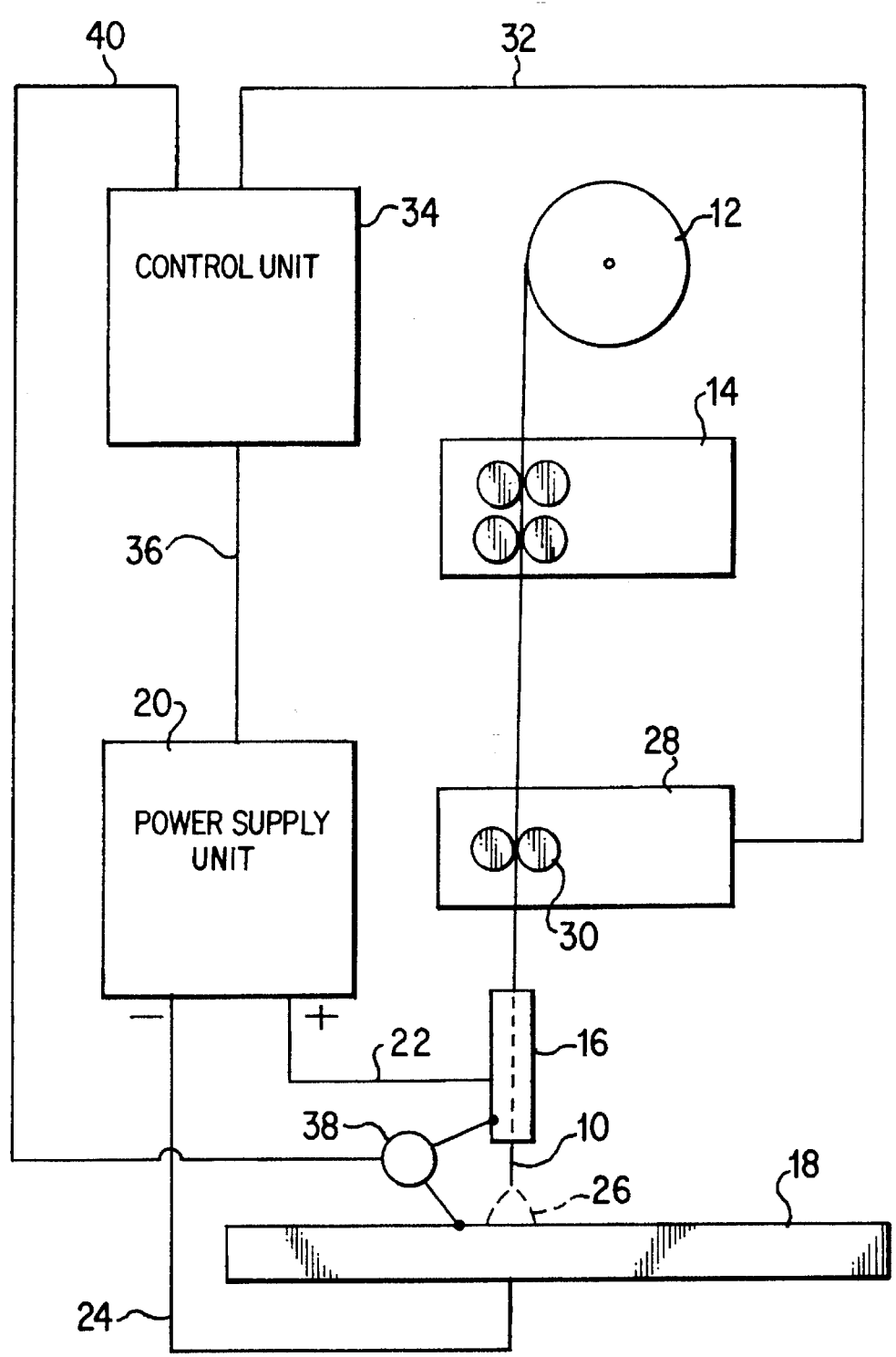
FIG. 1 is a schematic representation of an embodiment of apparatus for carrying out the present invention.

A prototype system for carrying out the present invention is illustrated schematically in FIG. 1. A continuous wire electrode 10 is unwound from a spool 12 and advanced by a drive unit 14 through a contact tube 16 to the vicinity of a workpiece 18 to be welded. Electrical power is supplied from a welding power supply unit 20 to electrode 10 through power lead 22 and contact tube 16, and to workpiece 18 through power lead 24. When the power supply is energized, an electric arc 26, which provides the welding energy, forms between the tip of electrode 10 and workpiece 18.

A wire feed rate sensor 28 is positioned along the path of electrode 10 and continuously monitors the speed of the moving consumable electrode wire, which typically advances at rates of from about 50 to about 250 mm/second. Wire feed rate sensor 28 is based on operating principles opposite those used in designing conventional wire feed rate sensors in that in the present invention the wire feed rate is monitored with a high frequency transducer with no attempt to even out short-term variations in signals. The high frequency sensing systems used in the present invention have response times less than 0.1 second, preferably between 0.001 and 0.05 second.

In the illustrated embodiment, the wire feed rate sensing transducer is based on a 5000 pulse-per-revolution optical encoder driven by a 50 mm circumference drive roller 30 in contact with the advancing wire electrode. The encoder contains a spinning perforated disk which interrupts a light beam between a light source and a photosensor as it spins, thereby producing a pulsed signal proportional to the speed of the wire. This system has a time response of 5 ms, which is about two orders of magnitude better than that of conventional, commercially available wire feed transducers. It is capable of detecting wire feed instabilities lasting on the order of 1/2000 second. For even better response times, higher resolution encoders could be utilized, or the present optical encoder could be driven at a higher ratio using a smaller drive pulley.

The output of wire feed sensor 28 is transmitted via control line 32 to a control unit 34, which compares the sensed wire speed to a desired reference value. Control unit 34 may be a suitably programmed digital computer. The programming of the computer is routine, and persons of ordinary skill in the programming art can readily prepare a suitable computer program to effect the desired comparison. If the computer senses that the wire speed has fallen below a predetermined threshold, it transmits a stop signal through output line 36, which trips a relay in power supply 20 and shuts off the welding current before the arc 26 lengthens sufficiently to reach and begin to melt contact tube 16. Of course, the control unit may also comprise a hard-wired comparator circuit compacted to a power relay.

In the simplest case, computer 34 can be programmed to interrupt the welding current when the wire speed goes to zero. Alternatively, the welding interrupt threshold may be set at a predetermined fraction, e.g. one-half, of the normal wire electrode feed rate. Persons of ordinary skill in the welding art can readily determine an appropriate interrupt threshold for any given application.

FIG. 1 further illustrates an alternative sensor arrangement for detecting interruptions in the wire electrode feed. This comprises a voltmeter 38 which is connected between contact tube 16 and workpiece 18 and which measures the voltage between them. The increase in the arc length and the decrease in electrode extension which occur after the electrode stops change the resistance of the weld electrical circuit. In a typical case this can result in a voltage increase of more than 4 volts within about 0.1 second. Voltage sensor 38 transmits the arc gap voltage through line 40 to control computer 34, which can detect any change and send a control signal through output line 36 to power supply 20 to shut off the welding current before contact tube melting occurs, If desired, the control unit can be programmed to respond to signals from either or both of optical encoder 28 and voltage sensor 38.

Other suitable wire feed rate transducers which could be used to advantage in the invention include inductive sensors which sense charges in the current through the wire electrode due to changes in the arc gap as a result of interruptions in the wire electrode feed, or ultrasonic or microwave (radar) sensors which measure the speed of the advancing wire electrode.

A simple proof-of-principle test was carried out to demonstrate the operation of the invention. While welding with a commercial gas metal arc welding power source at about 250 A, the advance of the wire electrode was stopped by a simulated jam in the liner. High-speed video and digital welding signal capture systems were used to record the test.

Figure 2A:
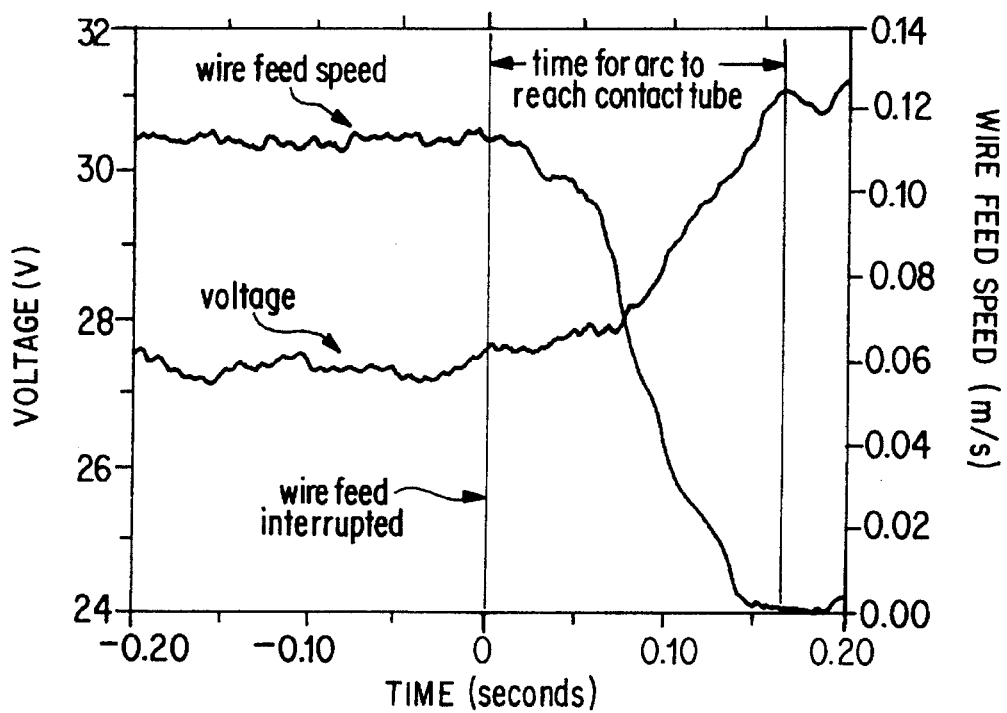
FIGS. 2a and 2b are graphs of the results of tests demonstrating the effectiveness of the invention.

FIG. 2a shows the wire feed rate and welding voltage data after the electrode feed was interrupted at a time equal to zero. The arc length and voltage increased as the remaining electrode extension was consumed. Within 100 ms after stopping the wire feed, the wire feed sensor confirmed that the wire had stopped. The voltage signal showed a gradual increase of about 4 volts over the next 100 ms. The video image indicated that the initial voltage increase was due to the increase in arc length until the contact tube was reached. The contact tube began to melt at about 0.15 second after the interruption of the wire feed.

Figure 2B:
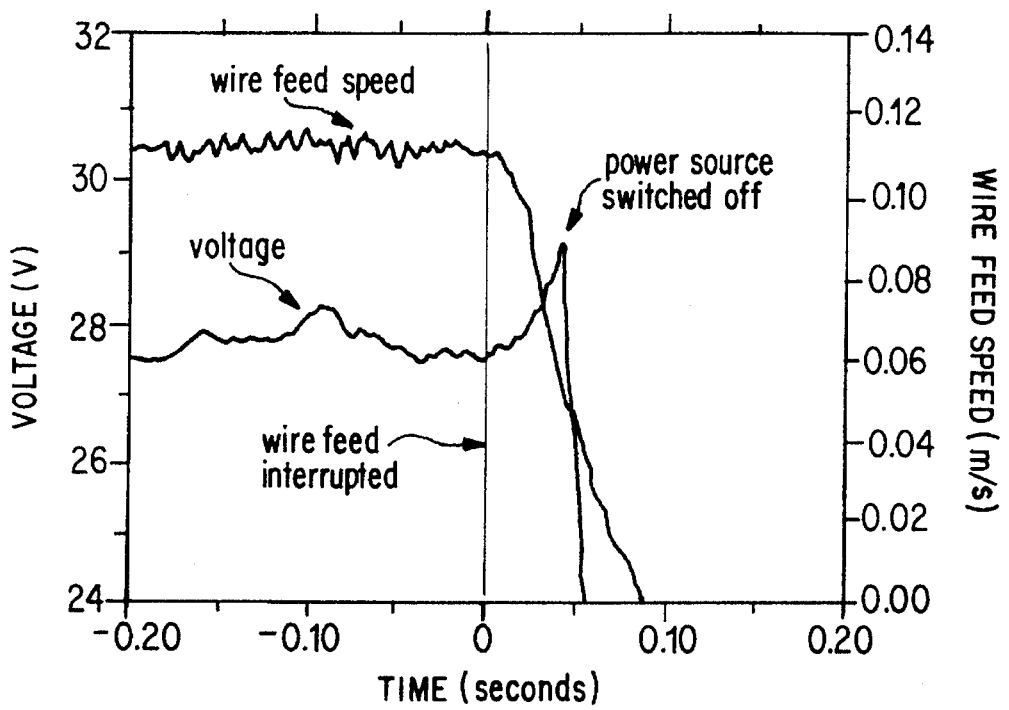

FIG. 2b shows a demonstration of how the control system of the invention can detect the interruption of the wire feed and avoid melting of the contact tube. The control system recognized the changes in wire feed rate and voltage and shut off the power to the electrodes within 0.05 second after detecting that the threshold values had been exceeded. This terminated the weld before the contact tube was melted or the weld was contaminated.

These tests thus show that the approximately 100 ms interval, during which the electrode is consumed, is adequate for a wire feed rate sensor system to detect the feed interruption and take corrective action by interrupting the welding voltage.

The invention provides for the first time the ability to accurately measure small and short-term variations in the wire feed rate in order to prevent contact tube melting. The feed speed data obtained by the feed rate sensor of the invention may also be useful in analyzing and predicting the operating life of the contact tube.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of preventing contact tube melting in arc welding due to an unintentional interruption of an advancing consumable electrode, said method comprising the steps of:

advancing a consumable welding electrode with a drive unit at a desired rate through a contact tube toward a workpiece to be welded;

applying a welding voltage between the contact tube and the workpiece and generating a welding arc between the advancing consumable electrode and the workpiece;

monitoring the consumable electrode advance rate with a sensor independent of said drive unit and having a response time of less than about 0.1 second;

comparing the monitored electrode advance rate to a threshold value indicative of the unintentional interruption in the electrode advance, and if the monitored electrode advance rate falls below the threshold value, interrupting the application of the welding voltage before continued consumption of the electrode brings the welding arc into contact with the contact tube.

2. A method according to claim 1, wherein the electrode advance rate is monitored by generating a pulsed electrical signal having a pulse rate proportional to the rate of advance of the electrode and detecting changes in the pulse rate of the signal.

3. A method according to claim 1, wherein the electrode advance rate is monitored by measuring the voltage between the contact tube and the workpiece and detecting changes in the measured voltage.

4. A method according to claim 1, wherein the sensor has a response time of from 0.001 to 0.05 second.

5. A method according to claim 1, wherein said threshold value is zero.

6. A method according to claim 1, wherein said threshold value is approximately one-half of the desired rate of electrode advance.

7. An apparatus for preventing contact tube melting in arc welding due to an unintentional interruption of an advancing consumable electrode, said apparatus comprising:

a source of the consumable welding electrode;

a drive unit for advancing the consumable electrode at a desired rate toward a workpiece to be welded;

a contact tube through which the consumable electrode is advanced;

an electrical power supply electrically connected to apply a welding voltage between the contact tube and the workpiece and generate a welding arc between the consumable electrode and the workpiece;

an electrode advance rate sensor having a response time of less than about 0.1 second operating independently of said drive unit;

a control unit connected to said electrode advance rate sensor for comparing the sensed advance rate with a threshold value indicative of the unintentional interruption in the electrode advance, said control unit terminating the application of the welding voltage between the contact tube and the workpiece if the sensed advance rate falls below the threshold value.

8. An apparatus according to claim 7, wherein the electrode advance rate sensor comprises an optical encoder which produced a pulsed electrical signal having a pulse rate proportional to the electrode advance rate.

9. An apparatus according to claim 7, wherein the electrode advance rate sensor comprises a voltage sensor which measures the welding voltage between the contact tube and the workpiece.

10. An apparatus according to claim 7, wherein the electrode advance rate sensor has a response time of from 0.001 to 0.05 seconds.

11. An apparatus according to claim 7, wherein the control unit comprises a programmed digital computer.

* * * * *